United States Patent
Riedel et al.

(10) Patent No.: US 9,481,463 B2
(45) Date of Patent: Nov. 1, 2016

(54) PANEL AND SYSTEM FOR AIRCRAFT CABIN MANAGEMENT

(71) Applicant: Airbus Operations GmbH, Hamburg (DE)

(72) Inventors: Christian Riedel, Hamburg (DE); Gerd Bruechmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/486,080

(22) Filed: Sep. 15, 2014

(65) Prior Publication Data

US 2015/0094882 A1 Apr. 2, 2015

(30) Foreign Application Priority Data

Sep. 30, 2013 (EP) .................................... 13186745

(51) Int. Cl.
*G01C 23/00* (2006.01)
*B64D 11/00* (2006.01)

(52) U.S. Cl.
CPC ... *B64D 11/0015* (2013.01); *B64D 2011/0038* (2013.01); *Y02T 50/46* (2013.01)

(58) Field of Classification Search
CPC .................... B64D 2011/0038; B60Q 3/0259; B60Q 3/0293
See application file for complete search history.

(56) References Cited

U.S. PATENT DOCUMENTS

| 7,698,025 B1 | 4/2010 | Cornell et al. |
| 2009/0202241 A1* | 8/2009 | Yu et al. .......................... 398/58 |
| 2010/0109530 A1 | 5/2010 | Eckel et al. |
| 2010/0224727 A1 | 9/2010 | Bauer et al. |
| 2014/0368113 A1* | 12/2014 | Eckel .............................. 315/77 |

FOREIGN PATENT DOCUMENTS

| EP | 1900637 | 3/2008 |
| WO | 9428679 | 12/1994 |

OTHER PUBLICATIONS

European Search Report, Feb. 21, 2014.

* cited by examiner

*Primary Examiner* — Michael D Lang
(74) *Attorney, Agent, or Firm* — Greer, Burns & Crain Ltd.

(57) ABSTRACT

An aircraft cabin management panel and an aircraft cabin management system including the aircraft cabin management panel. The aircraft cabin management panel includes a user interface and a control unit configured to communicate a control instruction to at least one of a plurality of cabin components provided in an aircraft cabin upon an input received via the user interface. The control instruction enables the at least one of the plurality of cabin components to perform an operation in accordance with the control instruction.

14 Claims, 8 Drawing Sheets

PANEL AND SYSTEM FOR AIRCRAFT CABIN MANAGEMENT

CROSS-REFERENCES TO RELATED APPLICATIONS

This application claims the benefit of the European patent application No. 13 186 745.9 filed on Sep. 30, 2013, the entire disclosures of which are incorporated herein by way of reference.

BACKGROUND OF THE INVENTION

The present disclosure generally relates to aircraft cabin management. More particularly, the present disclosure relates to an aircraft cabin management panel and an aircraft cabin management system comprising the panel.

The aircraft cabin is the section of an aircraft in which passengers travel. Typically, a cabin is divided into several parts including areas for passengers, comprising seats arranged in rows and alleys, as well as areas for flight attendants, such as the galley and areas close to the exit doors. Cabin management systems generally allow operating and monitoring cabin related functions provided to both passengers and the crew including, for example, controlling the cabin temperature, controlling the cabin illumination, controlling emergency and evacuation signaling, controlling the in-flight entertainment system, making passenger announcements, making crew-internal calls, monitoring the water and waste tank level, monitoring lavatory smoke indication, and monitoring the door and escape slide pressure status.

Known cabin management systems typically include a central server provided redundantly and located at the avionics compartment at the nose of an aircraft. The server forms the central control and interface component of the cabin management system. The server is connected to a flight attendant panel installed within the cabin and providing a remote user interface that may be operated by aircraft personnel to control and monitor the various functions around the cabin. Aircraft systems under control of the server are connected to the server via respective interfaces. For passenger related functions, the server is connected to a number of distributor units installed in the cabin ceiling above the passenger seats which allow connections to passenger service units or cabin illumination units. For crew related systems, the server is connected to a number of distributor units installed in the cabin ceiling near the exit doors which allow connections to crew systems, such as interphone handsets, for example.

While such cabin management systems have proven their suitability for some aircrafts, they turn out to be rather bulky and complex for other aircrafts.

Accordingly, there is a demand to provide an improved aircraft cabin management technique.

SUMMARY OF THE INVENTION

According to a first aspect, an aircraft cabin management panel is provided. The cabin management panel comprises a user interface and a control unit. The control unit is configured to communicate a control instruction to at least one of a plurality of cabin components provided in an aircraft cabin upon an input received via the user interface. The control instruction enables the at least one of the plurality of cabin components to perform an operation in accordance with the control instruction.

The plurality of cabin components may comprise at least one of a passenger service unit and a cabin illumination unit. Passenger service units may be arranged above the passenger seats and may provide passenger related functions to the passengers. For this purpose, passenger service units may comprise at least one of a fasten-seatbelt sign, a non-smoking sign, a flight attendant call button, a reading light and a loudspeaker. Cabin illumination units may be arranged in the cabin ceiling close to the overhead bins along the alleys of the cabin and may comprise, for example, LED strips or fluorescent light strips providing light to illuminate the cabin. A cabin component receiving a control instruction from the cabin management panel may process the control instruction and perform an operation in accordance with the control instruction. For example, a passenger service unit may receive a control instruction to turn on the fasten-seatbelt sign and a cabin illumination unit may receive a control instruction to reduce its brightness and generate a dimmed ambient light.

The user interface may be integrated into the cabin management panel. The user interface may be configured to display status information of at least one of the cabin components and may comprise a display, one or more indicator lights and/or other types of indicators for this purpose. The user interface may further be configured to receive an input from a user, such as a flight attendant, and may comprise one or more control buttons, switches and/or other types of controls for this purpose. Alternatively or additionally, the user interface may comprise a touchscreen configured to display respective status information and receive respective inputs. The cabin management panel may be installed in a wall of the aircraft cabin at a location visible and accessible to aircraft personnel, such as above the seat of a flight attendant, for example.

The control unit may be integrated into the cabin management panel. The control unit may be configured to receive an input from the user interface and may further be configured to control the user interface so as to display status information of at least one of the cabin components. Upon an input received via the user interface, the control unit may communicate a control instruction to at least one of the cabin components defining an operation to be performed by the at least one cabin component. The control instruction may comprise one or more parameters defining specifics of the operation to be performed. The control unit may also be configured to receive status information communicated from a cabin component. For example, a passenger service unit may indicate to the cabin management panel that a flight attendant call button has been pressed.

The cabin management panel may have an outer appearance of a prior art flight attendant panel described above. Other than known flight attendant panels, however, the cabin management panel described herein does not only serve as a remote user interface to a central server of the cabin management system, but contains control resources itself that allow for controlling the cabin components provided in the aircraft cabin. Relevant control resources (i.e., hardware and/or software resources required to control the cabin components) residing in the central server of known systems are thus incorporated into the cabin management panel, hence making the central server generally dispensable. This allows saving wiring from the cabin to the avionics compartment at very front of the aircraft as well as freeing space therein. The weight and space requirements of a cabin management system may therefore be reduced. Depending on the size of the aircraft, only suitable amounts of control resources may be built into the cabin management panel, hence keeping the weight and space requirements as low as possible.

In one implementation, the cabin management panel may comprise at least one cabin component interface configured to be connected to a cabin component of the plurality of cabin components or to a distributor unit. A cabin component interface may be realized as a hardware component integrated into the cabin management panel, such as, for example, as an interface card installed in the cabin management panel. A cabin component interface may implement an Ethernet or an RS-485 standard—but is not limited thereto—and may comprise one or more ports for connecting respective cables. A distributor unit may comprise one or more replicated interfaces configured to be connected to a cabin component of the plurality of cabin components or to another distributor unit. A distributor unit may forward receive information via the replicated interfaces to the respective destinations. A distributor unit may also comprise additional functions, such as, for example, one or more amplifiers provided for loudspeakers contained in passenger service units which are connected to the distributor unit.

The cabin management panel may further comprise at least one aircraft system interface configured to be connected to an aircraft system. The aircraft system may be one of a water and waste system, a cabin temperature control system, a smoke detection system, a cabin surveillance and aircraft video system, an audio briefing system, an in-flight entertainment system, an escape slide system and an avionic system. An aircraft system interface may be realized as a hardware component integrated into the cabin management panel, such as, for example, as an interface card installed in the cabin management panel. The user interface of the cabin management panel may be configured to display status information of the aircraft system and the control unit of the cabin management panel may be configured to control the user interface to display corresponding status information. The control unit may further be configured to communicate a control instruction to the aircraft system upon an input received via the user interface. The control instruction may comprise one or more parameters defining specifics of the operation to be performed. An aircraft system receiving a control instruction from the cabin management panel may process the control instruction and perform a corresponding operation in accordance with the control instruction. The control unit may also be configured to receive status information communicated from the aircraft system.

In one variant, the cabin management panel may also comprise at least one network interface configured to connect the cabin management panel to another cabin management panel via a network. Respective cabin management panels may thus communicate via the network and may, for example, perform a remote control or redundancy function among each other. A network interface may be realized as a hardware component integrated into the cabin management panel, such as, for example, as an interface card installed in the cabin management panel.

According to a second aspect, an aircraft cabin management system is provided. The system comprises a cabin management panel as described herein as well as a plurality of cabin components provided in an aircraft cabin. The control unit of the cabin management panel is configured to communicate the control instruction to at least one of the plurality of cabin components upon the input received via the user interface of the cabin management panel. The control instruction enables the at least one of the plurality of cabin components to perform the operation in accordance with the control instruction. As described above, the plurality of cabin components may comprise at least one of a passenger service unit and a cabin illumination unit.

Generally, one of the cabin components may be connected to the cabin management panel via a cabin component interface thereof. Alternatively, one of the cabin components may be connected to the cabin management panel via one or more distributor units.

In one possible implementation, one or more distributor units may be connected in series to at least one cabin component interface of the cabin management panel to form a linear-type daisy chain with the cabin management panel. At least one of the cabin components may in this case be connected to one of the distributor units, for example in a point-to-point manner. The at least one of the cabin components may be configured to be addressable by the cabin management panel using a direct addressing scheme.

In another possible implementation, one or more of the plurality of cabin components may be connected in series to at least one of the one or more distributor units to form a ring-type daisy chain therewith. Such cabin components may be configured to be addressable by the cabin management panel using a token passing scheme. A token ring network may thus be realized, for example.

In an alternative possible implementation of the cabin management system, one or more of the plurality of cabin components may be connected in series to the at least one cabin component interface of the cabin management panel to form a ring-type daisy chain with the cabin management panel. In such an implementation, no distributor units are interconnected between the cabin components and the cabin management panel. Such cabin components may be configured to be addressable by the cabin management panel using a token passing scheme. A token ring network may thus be realized, for example.

For establishing connections between cabin components, distributor units and the cabin management panel, Ethernet or RS-485 cables may be used, depending on the corresponding cabin component interface of the cabin management panel. Supported data rates for the connections may, for example, comprise 100 Mb/s (Fast Ethernet) or 1000 Mb/s (Gigabit Ethernet).

In a further variant, the cabin management system may comprise an additional cabin management panel as described herein. For ease of the following description, the cabin management panel described above will be referred to as "first cabin management panel" and the additional cabin management panel will be referred to as "second cabin management panel." Also, cabin components connected to the first cabin management panel will be referred to as "first cabin components" and cabin components connected to the second cabin management panel will be referred to as "second cabin components."

In one possible variant, the first cabin management panel and the second cabin management panel may be connected via a network connected at their at least one network interfaces. The network interfaces of the first cabin management panel and the second cabin management panel may be point-to-point connected or may each be connected to the network via a hub, a switch, or the like. The network may be a separate network for connecting cabin management panels only. The network may be an Ethernet network supporting data rates of 100 Mb/s (Fast Ethernet) or 1000 Mb/s (Gigabit Ethernet), for example.

The first cabin management panel and the second cabin management panel may be configured to implement a remote control or redundancy function among each other via the network. In one such variant, the control unit of the first cabin management panel may be configured to be controllable by the control unit of the second cabin management panel via the network. The control unit of the second cabin management panel may control the first cabin management panel to communicate a control instruction to at least one of the plurality of first cabin components upon an input received via the user interface of the second cabin management panel. The control instruction may enable the at least one of the plurality of first cabin components to perform an operation in accordance with the control instruction. Thus, the second cabin management panel may control the at least one of the plurality of first cabin components remotely through the first cabin management panel.

The first cabin management panel may be installed at a location in the front of the cabin, such as, for example, close to the front exit door of the aircraft. The second cabin management panel may be installed at a location in the rear of the cabin, such as, for example, close to a rear exit door of the aircraft. In such an arrangement, flight attendants may control and monitor the cabin management system from both the front and the rear of the cabin.

In a further possible implementation, the cabin management system may comprise a plurality of additional cabin components connected to the second cabin management panel, hereinafter referred to as "second cabin components." The control unit of the second cabin management panel may in this case be configured to communicate a control instruction to at least one of the plurality of second cabin components upon an input received via the user interface of the second cabin management panel. The control instruction may enable the at least one of the plurality of second cabin components to perform an operation in accordance with the control instruction.

In such an implementation, full system failures are generally prevented when a single component of the cabin management system fails. If, for example, the first cabin management panel fails, only the first cabin components will cease their operation whereas the second cabin management panel together with the second cabin components will continue to be fully operable. For example, if the first cabin components comprise all cabin components on the left side of the cabin and the second cabin components comprise all cabin components on the right side of the cabin, only one side of the cabin will go down in case of a failure in one of the cabin management panels.

The second cabin management panel may generally have the same configuration as the first cabin management panel and the amount of second cabin components may generally be equal to the amount of first cabin components. Also, the second cabin components may be connected to the second cabin management panel in any of the various possible variants of connecting the first cabin components to the first cabin management panel described above.

It will be understood by those skilled in the art that even more additional cabin management panels may be added to the cabin management system which may be configured in the same manner as one of the first and the second cabin management panel. A third cabin management panel may, for example, be installed at a center location of the cabin.

BRIEF DESCRIPTION OF THE DRAWINGS

In the following, the present disclosure will further be described with reference to exemplary implementations illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from these specific details.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs).

Figure 1:
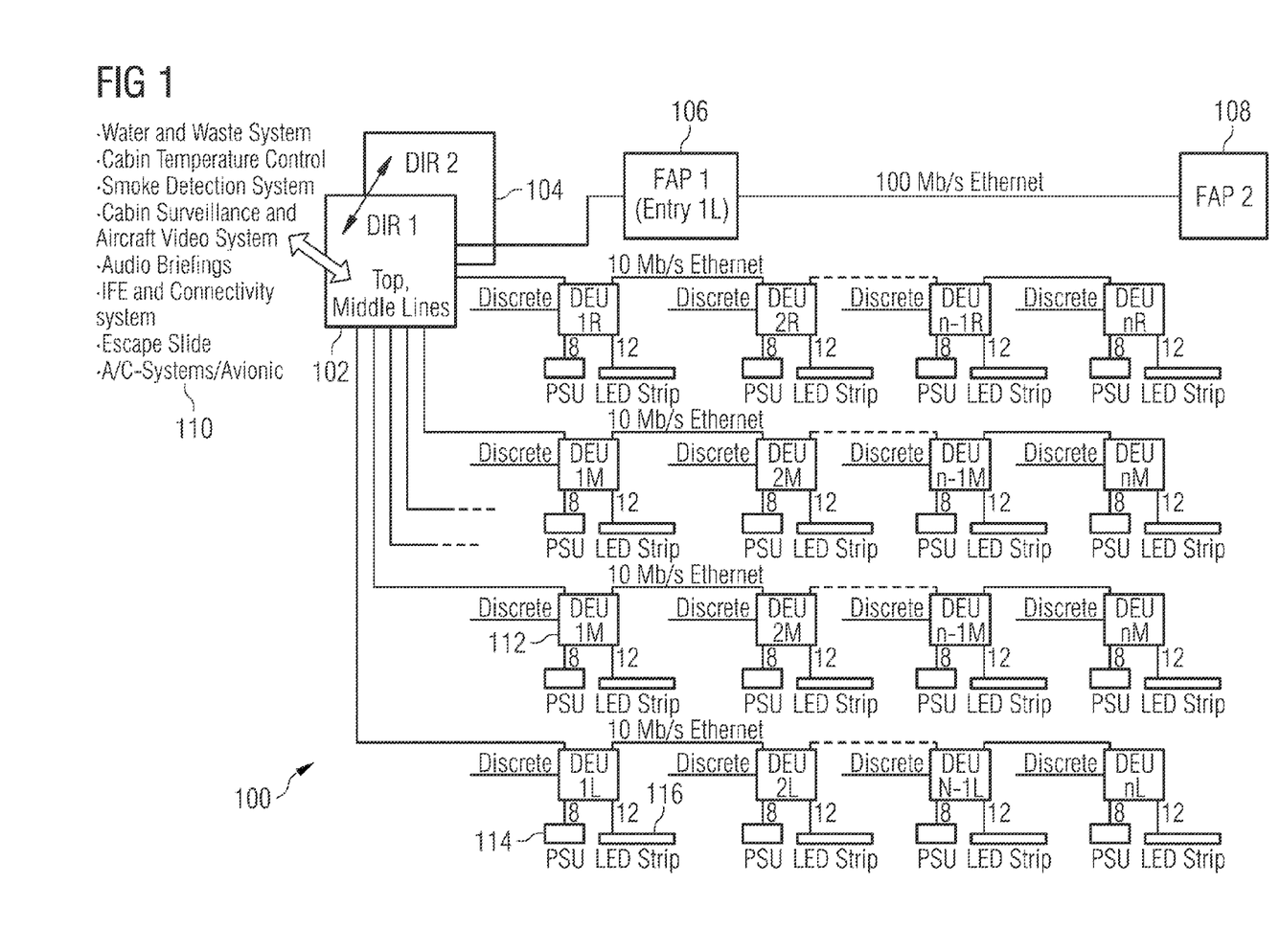
FIG. 1 schematically illustrates a prior art cabin management system.

FIG. 1 schematically illustrates a prior art cabin management system 100 by means of a cabin management system typically employed in Airbus aircraft, like the A380, called the Cabin Intercommunication Data System (CIDS). The cabin management system, or CIDS, 100 comprises a central server 102, called director (DIR), located at the avionics compartment at the nose of the aircraft. The central server 102 forms the central control and interface component of the cabin management system 100. A backup server 104 is provided for redundancy purposes and is steadily kept in hot stand-by. The central server 102 is connected to a flight attendant panel (FAP) 106, also called the forward attendant panel, installed within the cabin close to the front exit door of the aircraft. The flight attendant panel 106 provides a remote user interface to the control server 102 and may be operated by aircraft personnel to control and monitor various cabin functions in combination with the control server 102. The flight attendant panel 106 is also connected to a flight attendant panel 108 via a network. The flight attendant panel 108, also called the aft attendant panel, is installed within the cabin close to the rear exit door of the aircraft and provides, in the same manner as the first flight attendant panel 106, a remote user interface to the control server 102 that allows to control and monitor the various cabin functions in combination with the control server 102. In the illustrated example, the flight attendant panels 106 and 108 are connected using a 100 Mb/s Ethernet (Fast Ethernet) network.

The control server 102 is further connected to several aircraft systems 110, such as a water and waste system, a cabin temperature control system, a smoke detection system, a cabin surveillance and aircraft video system, an audio briefing system, an in-flight entertainment and connectivity system, an escape slide system and an avionic system. Status information of the aircraft systems 110 may be displayed on the flight attendant panels 106 and 108 and a flight attendant desiring to control one of the aircraft systems 110 may use the flight attendant panels 106 and 108 to tell the control server 102 to correspondingly control the respective aircraft system 110.

For providing passenger related functions in the cabin, the central server 102 is connected to a plurality of distributor units 112, also called decoder/encoder units (DEU). In the example of FIG. 1, four rows of distributor units 112 connected in series and each forming a linear-type daisy chain with the central server 102 are provided. Each row comprises n distributor units 112 which may be installed in the cabin ceiling above the passenger seats. In FIG. 1, two rows are indicated to be installed above the middle seat rows (M), one above the left seat row (L) and one above the right seat row (R) of the cabin. Eight passenger service units (PSU) 114 and twelve cabin illumination units 116, here provided as LED strips, are connected to each distributor unit 112 in a point-to-point manner. The passenger service units 114 and cabin illumination units 116 represent cabin components in the sense of the present disclosure. The passenger service units 114 may be arranged above the passenger seats and may comprise at least one of a fasten-seatbelt sign, a non-smoking sign, a flight attendant call button, a reading light and a loudspeaker. The cabin illumination units 116 may be disposed in the ceiling of the cabin along the alleys and provide light to illuminate the cabin. Status information of the passenger service units 114 and the cabin illumination units 116 may be displayed on the flight attendant panels 106 and 108 and a flight attendant desiring to control one of the passenger service units 114 and the cabin illumination units 116 may use the flight attendant panels 106 and 108 to tell the control server 102 to correspondingly control the respective cabin passenger service unit 114 and/or cabin illumination unit 116.

Generally, in CIDS, there are two types of distributor units, namely type A DEUs and type B DEUs. Type A DEUs are connected to the central server 102 via top lines and provide interfaces for passenger related systems, such as the passenger service units 114 or cabin illumination units 116. Type B DEUs are connected to the central server 102 via middle lines and provide interfaces for crew related systems, such as interphone handsets, for example. In the example of FIG. 1, only type A DEUs are depicted and type B DEUs are omitted for the sake of clarity of illustration. Middle lines connecting the central server 102 to type B DEUs are indicated with terminated dashed lines only. In this regard, it will be understood that the arrangement depicted in FIG. 1 is merely exemplary and, also, that—depending on the aircraft—the number and arrangement of seat rows and distributor units as well as the number of cabin components connected to a distributor unit may differ.

Figure 2:
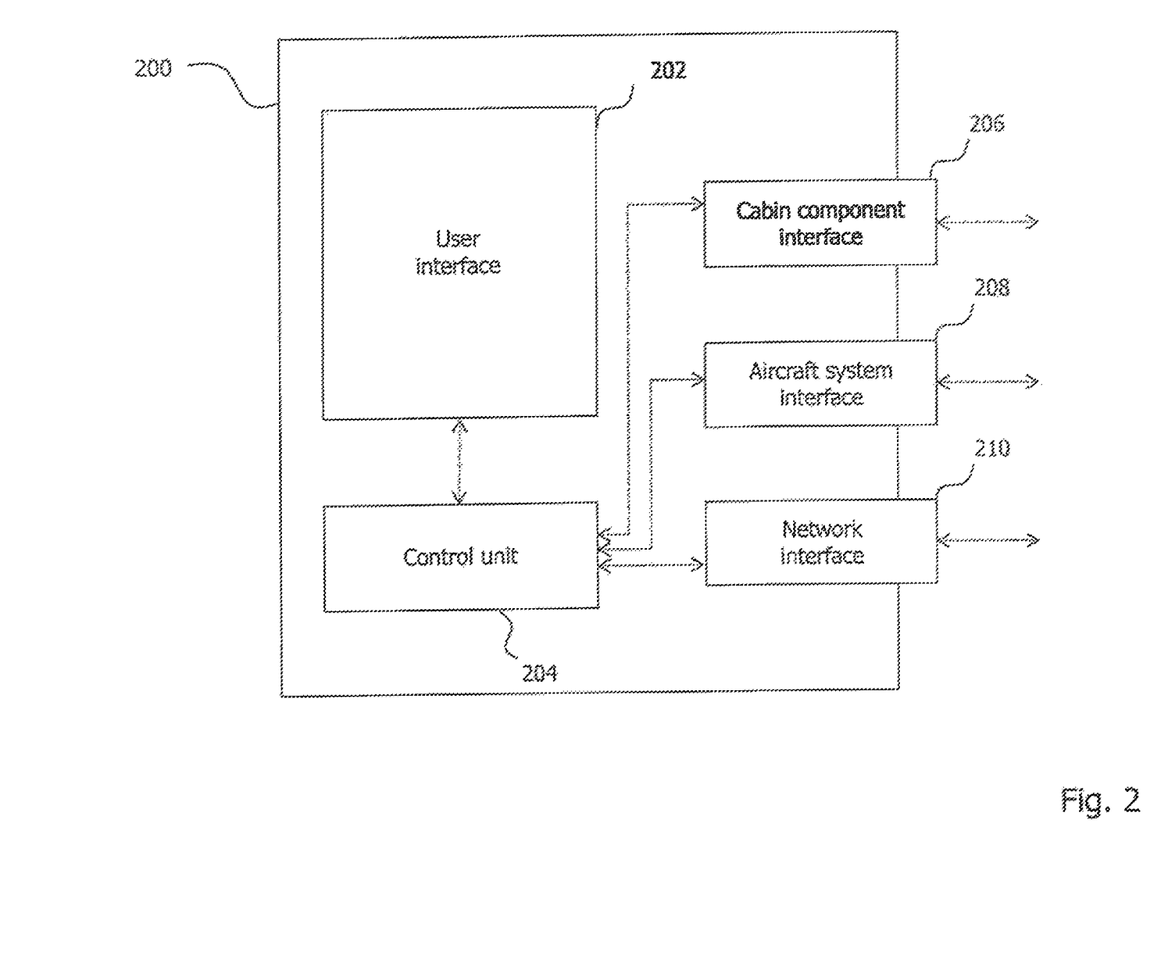
FIG. 2 schematically illustrates an implementation of a cabin management panel.

FIG. 2 schematically illustrates an implementation of an aircraft cabin management panel 200. The cabin management panel 200 comprises a user interface 202 which may display status information of at least one cabin component and may receive an input from a user, such as a flight attendant. The cabin management panel 200 further comprises a control unit 204 which may receive an input from the user interface 202. Upon receiving an input via the user interface 202, the control unit 204 may communicate a control instruction to at least one cabin component or an aircraft system defining an operation to be performed by the at least one cabin component or the aircraft system. For the purpose of communicating control instructions, the cabin management panel 200 comprises a cabin component interface 206 through which the control unit 204 may send and receive data to and from at least one cabin component. Similarly, the cabin management panel 200 comprises an aircraft system interface 208 through which the control unit 204 may exchange data with at least one aircraft system. Moreover, the cabin management panel 200 comprises a network interface 210 through which the control unit 202 may communicate with other cabin management panels, such in order to perform a remote control function, for example.

Figure 3:
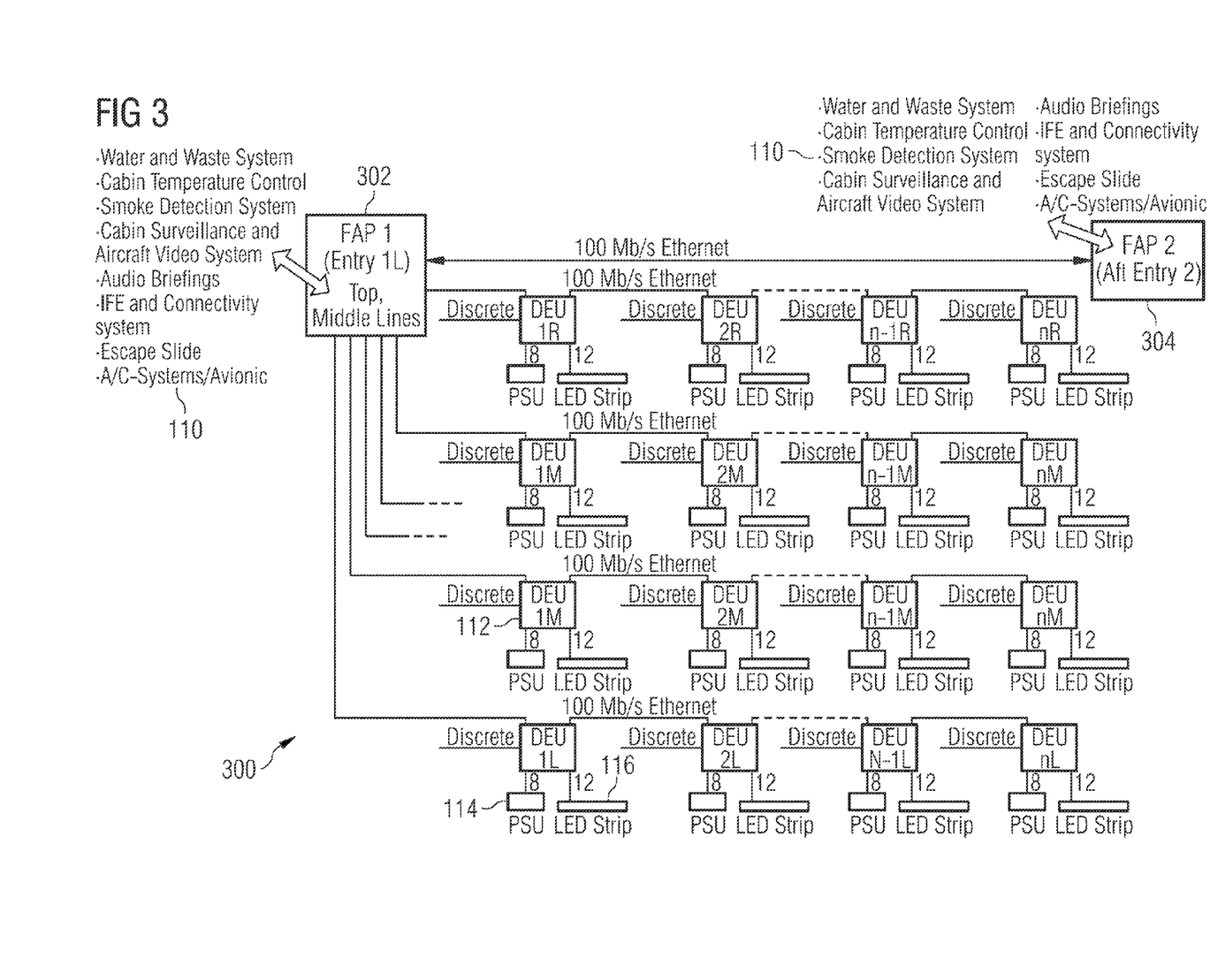
FIG. 3 schematically illustrates a cabin management system in an implementation having linear-type daisy chained distributor units connected to a first cabin management panel, wherein the cabin components are connected to the distributor units.

FIG. 3 schematically illustrates an aircraft cabin management system 300 the general architecture of which is based on the architecture of the cabin management system 100 of FIG. 1. The cabin management system 300 differs from the cabin management system 100, however, in that the central servers 102 and 104 as well as the flight attendant panels 106 and 108 are absent. Instead of these components, the cabin management system 300 comprises a first cabin management panel 302 and a second cabin management panel 304 both of which are essentially configured in the manner of the cabin management panel 200 described above in combination with FIG. 2. Thus, both the first and the second cabin management panel 302 and 304 themselves contain control resources (i.e., hardware and/or software resources) that allow for controlling the cabin components and aircraft systems provided in the aircraft cabin. The absence of the central servers 102 and 104 saves wiring from the cabin to the avionics compartment at very front of the aircraft and frees space therein. The overall system's complexity is therefore reduced and weight and space requirements are diminished. From within the cabin, the first and the second cabin management panel 302 and 304 may still have an outer appearance as the prior art flight attendant panels 106 and 108 of FIG. 1.

In terms controlling the aircraft systems 110, both the first and the second cabin management panels 302 or 304 are connected via at least one of their aircraft system interfaces to the aircraft systems 110. Upon an input received at the user interface of either the first or the second cabin management panel 302 or 304, the corresponding control unit of the either first or the second cabin management panel 302 or 304 may communicate a corresponding control instruction to the respective aircraft system 110. Since both the first and the second cabin management panel 302 and 304 are connected and capable to control the aircraft systems 110, they implement a redundancy function for these systems.

In terms of controlling the cabin components, i.e., the passenger service units 114 and the cabin illumination units 116, only the first cabin management panel 302 is connected to the cabin components via at least one of its cabin component interfaces. Upon an input received at the user interface of the first cabin management panel 302 with regard to the control of a cabin component, the control unit of the first cabin management panel 302 communicates a corresponding control instruction to the respective cabin component. The second cabin management panel 304 is connected to the first cabin management panel 302 via a network and may therefore control the cabin components remotely through the first cabin management panel 302.

Figure 4:
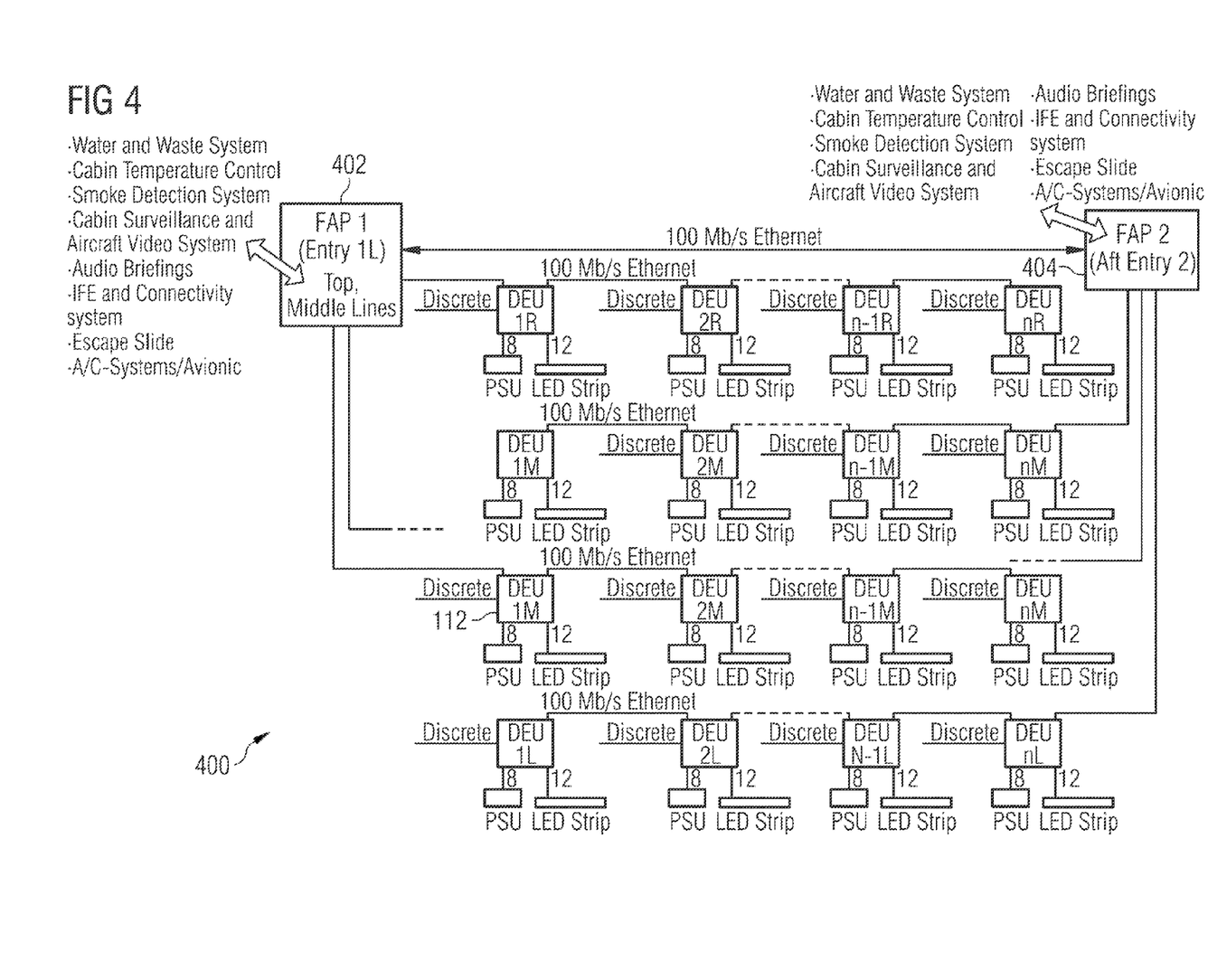
FIG. 4 schematically illustrates a cabin management system in an implementation having linear-type daisy chained distributor units connected to a first and second cabin management panel, wherein the cabin components are connected to the distributor units.

FIG. 4 shows a variant of the implementation illustrated in FIG. 3. The cabin management system 400 shown here differs from the cabin management system 300 in that the distributor units 112 arranged for the left seat row (L) and the distributor units 112 arranged for one of the middle seat rows (M) as well as one middle line for connection to a type B DEU are connected to the second cabin management panel 404 instead of the first cabin management panel 402. This arrangement prevents full system failures if just one component of the cabin management system 400 fails. If, for example, the first cabin management panel 402 fails, only the cabin components connected to the first cabin management panel 402 will go down whereas the second cabin management panel 404 together with its cabin components will continue to operate. Also, the number of cabin component interfaces required to be integrated into the first cabin management panel 402 is reduced, thus allowing a thinner and more space saving design of the first cabin management panel 402.

Figure 5:
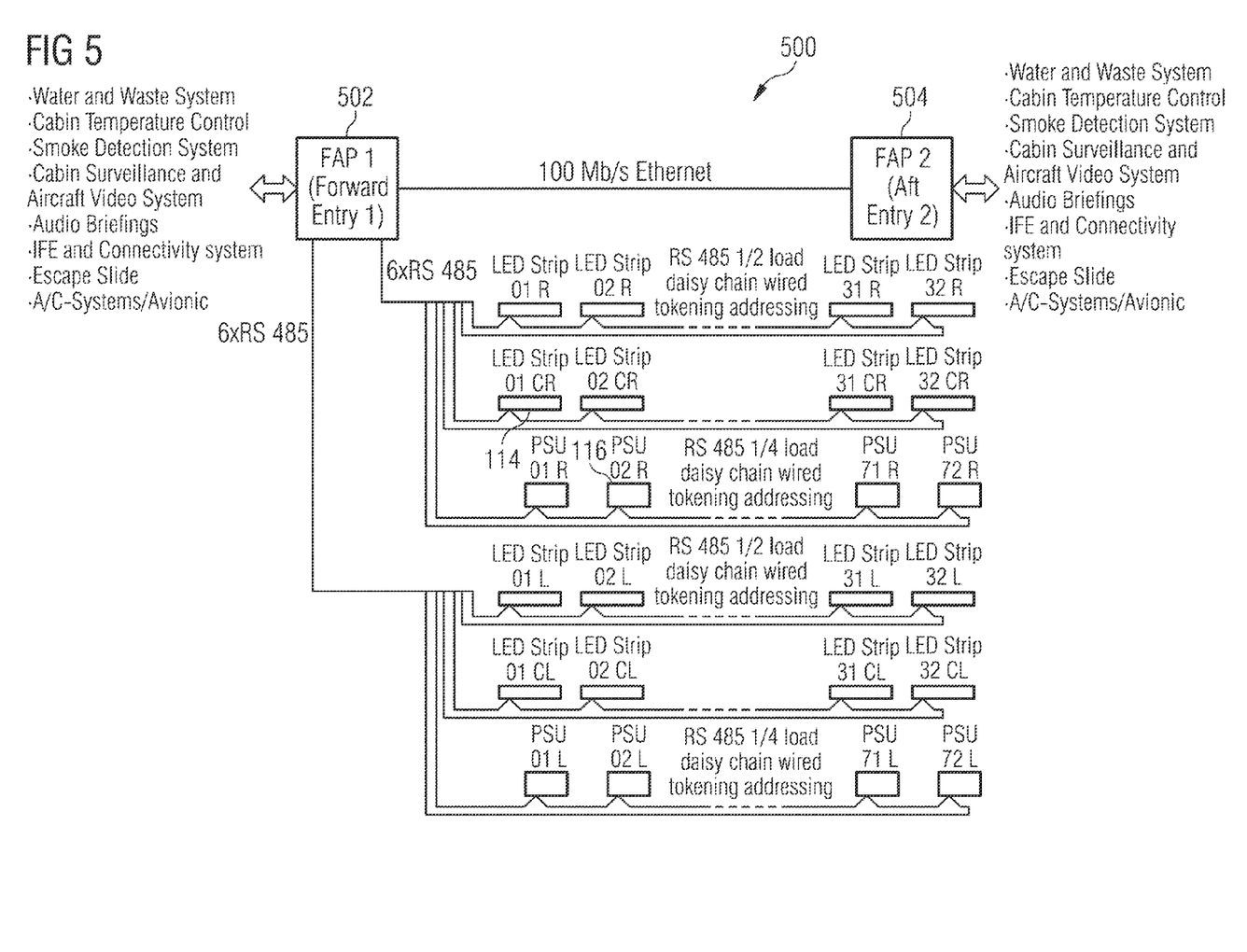
FIG. 5 schematically illustrates a cabin management system in an implementation having ring-type daisy chained cabin components connected to a first cabin management panel.

FIG. 5 illustrates another variant of the implementation according to FIG. 3. The cabin management system 500 shown here differs from the cabin management system 300 in that the cabin components are connected to the first cabin management panel 502 without the use of any interconnected distributor units 112. Here, ring-type daisy chains are formed with the first cabin management panel 502 by a number of serially connected cabin components. More specifically, three ring-type daisy chains are formed at the right cabin side, two of which include 32 serially connected cabin illumination units 116 (R, CR) and one of which includes 72 serially connected passenger service units 114 (R). An equivalent arrangement is provided for the left cabin side (L, CL, L). Each daisy chain may be connected to the first cabin management unit 502 via a cabin component interface thereof having two ports or via two cabin component interfaces each having one port, for example. As indicated, the daisy chains may be wired using RS-485 cables, but this is no limitation and Ethernet may be used as well, for example. Due to the ring-like topology, the cabin components may be addressed by the first cabin management panel 502 using a token passing scheme, but it will be understood that the cabin components may be addressed using a direct addressing scheme as well. As described with respect to FIG. 3, a second cabin management panel 504 is connected to the first cabin management panel 502 via a network and may therefore control the cabin components remotely through the first cabin management panel 502.

In the implementation of FIG. 5, the absence of the distributor units largely reduces number of system components, thus yielding a reduction of the system's overall complexity and its weight and space requirements. Also, improved installation times are achievable. It will be understood that the arrangement of cabin components depicted in FIG. 5 is merely exemplary and that the number and arrangement of rows and serially connected cabin components may vary, for example.

Figure 6:
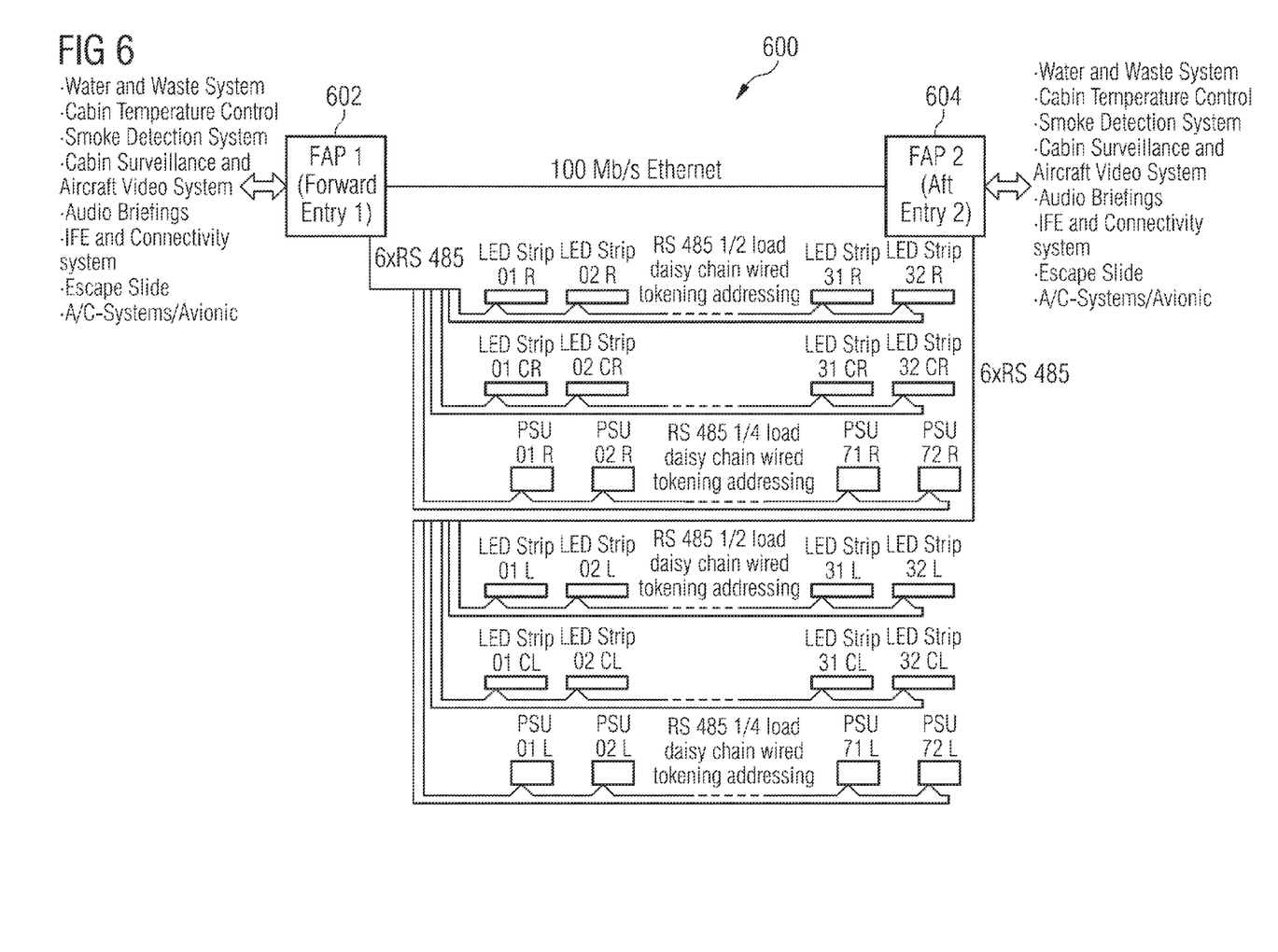
FIG. 6 schematically illustrates a cabin management system in an implementation having ring-type daisy chained cabin components connected to a first and second cabin management panel.

FIG. 6 shows a variant of the implementation according to FIG. 5. The cabin management system 600 illustrated here differs from the cabin management system 500 in that the left-side cabin components (L) are connected to the second cabin management panel 604 instead of the first cabin management panel 602. Thus, if the first cabin management panel 602 fails, only the cabin components connected to the first cabin management panel 602 will cease their operation whereas the second cabin management panel 604 together with its cabin components will continue to be fully operable. Also, the number of cabin component interfaces required to be integrated into the first cabin management panel 602 is reduced, thus allowing a thin and space saving design of the first cabin management panel 602.

Figure 7:
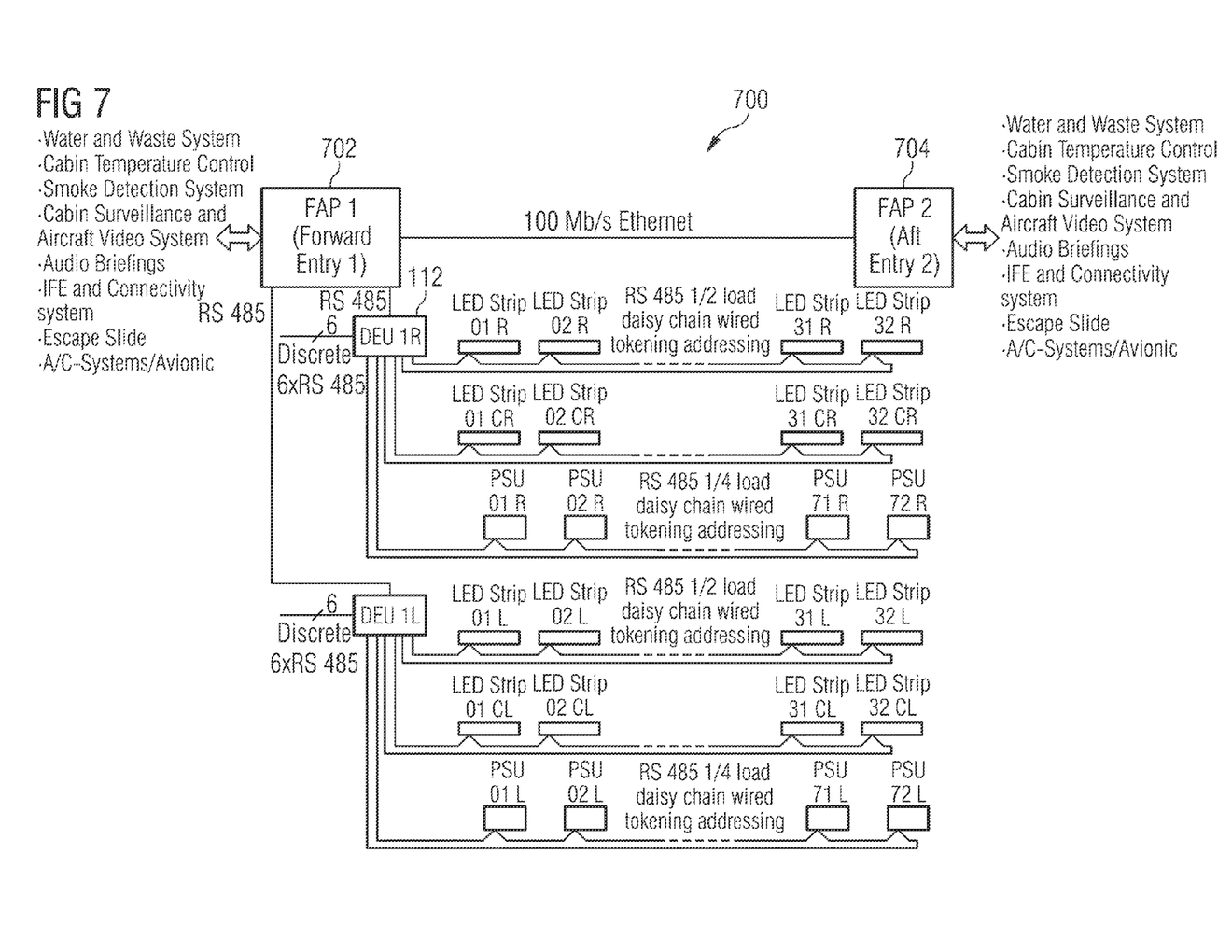
FIG. 7 schematically illustrates a cabin management system in an implementation having ring-type daisy chained cabin components connected to a distributor unit connected to a first cabin management panel.

FIG. 7 depicts a variant of the implementation according to FIG. 5. The cabin management system 700 shown here differs from the cabin management system 500 in that a single distributor unit 112 is interconnected between the ring-type daisy chains of the serially connected cabin components and the first cabin management panel 702, i.e., a single distributor unit 112 is connected to the first cabin management panel 702 and the ring-type daisy chains of the serially connected cabin components are formed with the single distributor unit 112 instead of the first cabin management panel 702. This implementation keeps the number of cabin component interfaces required to be integrated into the first cabin management panel 702 at a minimum, thus allowing a very thin and space saving design of the first cabin management panel 702 and potentially enabling the installation of the first cabin management panel 702 in thin cabin walls with only little space available. Also, large amounts of wiring may be saved when the single distributor unit 112 is arranged at a certain distance from the first cabin management panel 702. As described with respect to FIGS. 3 and 5, a second cabin management panel 704 is connected to the first cabin management panel 702 via a network and may therefore control the cabin components remotely through the first cabin management panel 702.

Figure 8:
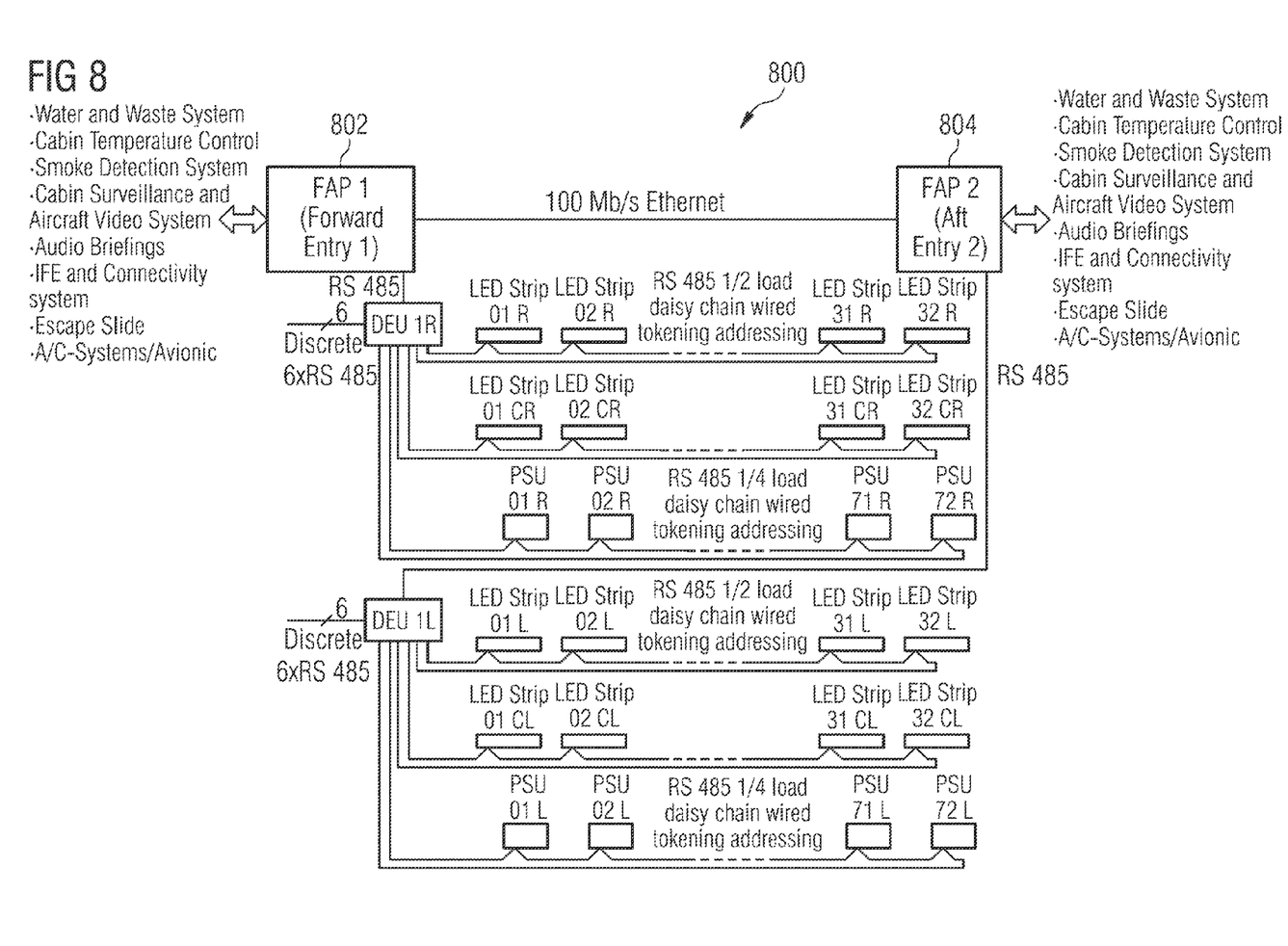
FIG. 8 schematically illustrates a cabin management system in an implementation having ring-type daisy chained cabin components connected to a distributor unit connected to a first and second cabin management panel.

FIG. 8 shows a variant of the implementation shown in FIG. 7. The cabin management system 800 illustrated here differs from the cabin management system 700 in that the left-side cabin components (L) are connected to the second cabin management panel 804 instead of the first cabin management panel 802. Similar to the implementations shown in FIGS. 4 and 6, this arrangement prevents full system failures if just one component of the cabin management system 800 fails.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft cabin management panel, comprising:
   a user interface; and
   a control unit configured to control at least one of a plurality of cabin components provided in an aircraft cabin and configured to control at least one aircraft system, wherein the at least one of the plurality of cabin components comprises at least one of a passenger service unit and a cabin illumination unit, and wherein the at least one aircraft system comprises at least one of a water and waste system, a cabin temperature control system, a smoke detection system, a cabin surveillance and aircraft video system, an audio briefing system, an in-flight entertainment system, an escape slide system, and an avionic system,
   wherein the control unit is configured to communicate a control instruction to the at least one of the plurality of cabin components or to the at least one aircraft system upon an input received via the user interface, the control instruction enabling the at least one of the plurality of cabin components or the at least one aircraft system, upon receipt of the control instruction from the control unit, to process the control instruction and to perform an operation in accordance with the control instruction, wherein the cabin management panel is installed in the aircraft cabin and has an outer appearance of a flight attendant panel.

2. The cabin management panel of claim 1, further comprising at least one cabin component interface configured to be connected to one of a cabin component of the plurality of cabin components and to a distributor unit.

3. The cabin management panel of claim 1, further comprising at least one aircraft system interface configured to be connected to an aircraft system.

4. The cabin management panel of claim 1, further comprising at least one network interface configured to be connected to another cabin management panel via a network.

5. An aircraft cabin management system, comprising:
a plurality of cabin components provided in an aircraft cabin, wherein at least one of the plurality of cabin components comprises at least one of a passenger service unit and a cabin illumination unit;
at least one aircraft system, wherein the at least one aircraft system comprises at least one of a water and waste system, a cabin temperature control system, a smoke detection system, a cabin surveillance and aircraft video system, an audio briefing system, an in-flight entertainment system, an escape slide system, and an avionic system; and
an aircraft cabin management panel, comprising:
a user interface; and
a control unit configured to control the at least one of the plurality of cabin components provided in the aircraft cabin and configured to control the at least one aircraft system,
wherein the control unit of the aircraft cabin management panel is configured to communicate a control instruction to the at least one of the plurality of cabin components or to the at least one aircraft system upon an input received via the user interface of the aircraft cabin management panel, the control instruction enabling the at least one of the plurality of cabin components or the at least one aircraft system, upon receipt of the control instruction from the control unit, to process the control instruction and to perform an operation in accordance with the control instruction,
wherein the cabin management panel is installed in the aircraft cabin and has an outer appearance of a flight attendant panel.

6. The cabin management system of claim 5, wherein one or more distributor units are connected in series to the at least one cabin component interface of the aircraft cabin management panel to form a linear-type daisy chain with the aircraft cabin management panel.

7. The cabin management system of claim 6, wherein at least one of the plurality of cabin components is connected to one of the one or more distributor units.

8. The cabin management system of claim 7, wherein the at least one of the plurality of cabin components is configured to be addressable using a direct addressing scheme.

9. The cabin management system of claim 6, wherein one or more of the plurality of cabin components are connected in series to at least one of the one or more distributor units to form a ring-type daisy chain therewith.

10. The cabin management system of claim 5, wherein one or more of the plurality of cabin components are connected in series to the at least one cabin component interface of the aircraft cabin management panel to form a ring-type daisy chain with the aircraft cabin management panel.

11. The cabin management system of claim 9, wherein the one or more of the plurality of cabin components are configured to be addressable using a token passing scheme.

12. The cabin management system of claim 5, further comprising an additional substantially identical aircraft cabin management panel.

13. The cabin management system of claim 12, wherein the aircraft cabin management panel and the additional aircraft cabin management panel are connected via a network connected at their at least one network interfaces, wherein the control unit of the aircraft cabin management panel is configured to be controllable by the control unit of the additional aircraft cabin management panel via the network to communicate a control instruction to at least one of the plurality of cabin components upon an input received via the user interface of the additional aircraft cabin management panel, the control instruction enabling the at least one of the plurality of cabin components to perform an operation in accordance with the control instruction.

14. The cabin management system of claim 12, further comprising a plurality of additional cabin components provided in the aircraft cabin, wherein the control unit of the additional aircraft cabin management panel is configured to communicate a control instruction to at least one of the plurality of additional cabin components upon an input received via the user interface of the additional aircraft cabin management panel, the control instruction enabling the at least one of the plurality of additional cabin components to perform an operation in accordance with the control instruction.

* * * * *